(12) United States Patent
Uchiyama et al.

(10) Patent No.: US 9,464,199 B2
(45) Date of Patent: Oct. 11, 2016

(54) LIQUID EJECTION APPARATUS

(71) Applicant: SEIKO EPSON CORPORATION, Tokyo (JP)

(72) Inventors: Masaki Uchiyama, Azumino (JP); Keitaro Nakano, Matsumoto (JP); Nobuhito Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 13/766,188

(22) Filed: Feb. 13, 2013

(65) Prior Publication Data

US 2013/0208062 A1 Aug. 15, 2013

(30) Foreign Application Priority Data

Feb. 15, 2012 (JP) ................................. 2012-030746

(51) Int. Cl.
*B41J 2/165* (2006.01)
*C09D 11/30* (2014.01)
*C09D 11/101* (2014.01)
*C09D 11/102* (2014.01)
*C09D 11/34* (2014.01)

(52) U.S. Cl.
CPC ............ *C09D 11/30* (2013.01); *B41J 2/16544* (2013.01); *C09D 11/101* (2013.01); *C09D 11/102* (2013.01); *C09D 11/34* (2013.01)

(58) Field of Classification Search
None
See application file for complete search history.

(56) References Cited

U.S. PATENT DOCUMENTS

| | | | |
|---|---|---|---|
| 4,223,322 A * | 9/1980 | van Raamsdonk ............. | 347/31 |
| 6,382,767 B1 * | 5/2002 | Greive ............................ | 347/30 |
| 6,561,618 B1 * | 5/2003 | Simmons et al. .............. | 347/32 |
| 6,932,469 B2 * | 8/2005 | May et al. ...................... | 347/103 |
| 8,899,722 B2 * | 12/2014 | O'Hara ................ | B41J 2/16544 347/22 |
| 2002/0034674 A1 * | 3/2002 | Starz et al. ...................... | 429/40 |
| 2004/0155921 A1 * | 8/2004 | Simmons et al. .............. | 347/33 |
| 2005/0111861 A1 * | 5/2005 | Calamita et al. ............... | 399/66 |
| 2005/0162461 A1 * | 7/2005 | Fujimori et al. ................ | 347/33 |
| 2008/0097013 A1 * | 4/2008 | Mizutani ........................ | 524/107 |
| 2010/0238234 A1 * | 9/2010 | Inoue ............................. | 347/33 |
| 2010/0245466 A1 * | 9/2010 | Inoue ............................. | 347/30 |
| 2011/0234693 A1 | 9/2011 | Yamaguchi et al. | |
| 2012/0328854 A1 | 12/2012 | Matsuyama et al. | |
| 2013/0120495 A1 * | 5/2013 | Nakamura et al. ............. | 347/33 |
| 2013/0120496 A1 * | 5/2013 | Nakamura et al. ............. | 347/33 |

FOREIGN PATENT DOCUMENTS

| | | | |
|---|---|---|---|
| JP | 2001-260368 | | 9/2001 |
| JP | 2003-103788 | | 4/2003 |
| JP | 2003261803 A | * | 9/2003 |
| JP | 2004-202842 | | 7/2004 |
| JP | 2005-212351 | | 8/2005 |
| JP | 2008-137266 | | 6/2008 |
| JP | 2008-229962 | | 10/2008 |
| JP | 2010207728 A | * | 9/2010 |
| JP | 2011-510108 | | 3/2011 |
| JP | 09/22/2011 | | 9/2011 |
| JP | 10/20/2011 | | 10/2011 |

\* cited by examiner

*Primary Examiner* — Julian Huffman
*Assistant Examiner* — Sharon A Polk
(74) *Attorney, Agent, or Firm* — Workman Nydegger (57) ABSTRACT

A liquid ejection apparatus includes an ejection head having nozzles that eject liquid, a strap member that holds the liquid ejected from the ejection head, a feeding roller and a winding roller around which the strap member is wound, and a driving source that rotates the winding roller, wherein a flash point of the liquid that is held in the strap member is 95 degrees Celsius or more, and the driving source is disposed at a position closer to the winding roller than to the feeding roller.

5 Claims, 5 Drawing Sheets

LIQUID EJECTION APPARATUS

BACKGROUND

1. Technical Field

This claims priority to Japanese Patent Application No. 2012-030746 filed on Feb. 15, 2012. The entire disclosure of Japanese Patent Application No. 2012-030746 is expressly incorporated by reference herein.

The present invention relates to a liquid ejection apparatus having a wiper that absorbs liquid attached on a nozzle forming surface of an ejection head.

2. Related Art

JP-A-2001-260368 discloses an ink jet printer as an example of such a liquid ejection apparatus. The ink jet printer has a wiper configured to be wound by a winding roller by driving a motor.

When the motor drives, the ambient temperature in the printer increases. Accordingly, the wiper is made of a flame retardant material having a high flame resistance. The wiper also needs to be selected considering other properties than flame resistance. For example, in considering efficiency of cleaning, the wiper preferably has high liquid absorbing property. Accordingly, when trying to provide the wiper with flame resistance and other properties than flame resistance, choices for a material of the wiper are limited.

SUMMARY

An advantage of some aspects of the invention is that a liquid ejection apparatus including a wiper whose material can be selected from a wide range of materials is provided.

According to an aspect of the invention, a liquid ejection apparatus includes an ejection head having nozzles that eject liquid, a strap member that holds the liquid ejected from the ejection head, a feeding roller and a winding roller around which the strap member is wound, and a driving source that rotates the winding roller, wherein a flash point of the liquid that is held in the strap member is 95 degrees Celsius or more, and the driving source is disposed at a position closer to the winding roller than to the feeding roller.

The liquid of the invention has a flash point which is 95 degrees Celsius or more. Further, the driving source is disposed at a position closer to the winding roller than to the feeding roller. In addition, the ambient temperature of the driving source increases by driving the driving source. Accordingly, it is preferable that the strap member (wiper) wound by the winding roller, which is closer to the driving source than the feeding roller is, is resistant to flame. The liquid having a high flash point is held in the strap member (wiper) that is wound by the winding roller. Accordingly, the wiper wound by the winding roller is hard to flame. That is, since a flame resistance required for the strap member (wiper) is low, choices for a material of the strap member (wiper) are widened.

In the liquid ejection apparatus according to the above aspect of the invention, a portion of the strap member which lies on the side of the feeding roller with respect to a portion that corresponds to the nozzle forming surface is defined as a feeding-out portion, and a distance between the feeding-out portion and the driving source is 30 mm or more.

The distance between the feeding-out portion and the driving source is sufficiently larger than the maximum distance that sparks generated by the driving source fly. Accordingly, it is possible to prevent sparks generated by the driving source from reaching to the feeding-out portion.

In the liquid ejection apparatus according to the above aspect of the invention, a portion of the strap member which lies on the side of the feeding roller with respect to a portion that corresponds to the nozzle forming surface is defined as a feeding-out portion, and the liquid ejection apparatus includes a wall which is disposed between the feeding-out portion and the driving source.

The above liquid ejection apparatus includes a wall which is disposed between the feeding-out portion and the driving source. Accordingly, it is possible to prevent sparks generated by the driving source from reaching to the feeding-out portion, since the wall is disposed therebetween.

In the liquid ejection apparatus according to the above aspect of the invention, a portion of the strap member which lies on the side of the winding roller with respect to a portion that corresponds to the nozzle forming surface is defined as a winding portion, and a distance between the winding portion and the driving source is 20 mm or less.

Since the above liquid ejection apparatus has the distance between the winding portion and the driving source which is 20 mm or less, the winding roller and the driving source can be positioned in more compact size compared with the case where the distance between the winding portion and the driving source is more than 20 mm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
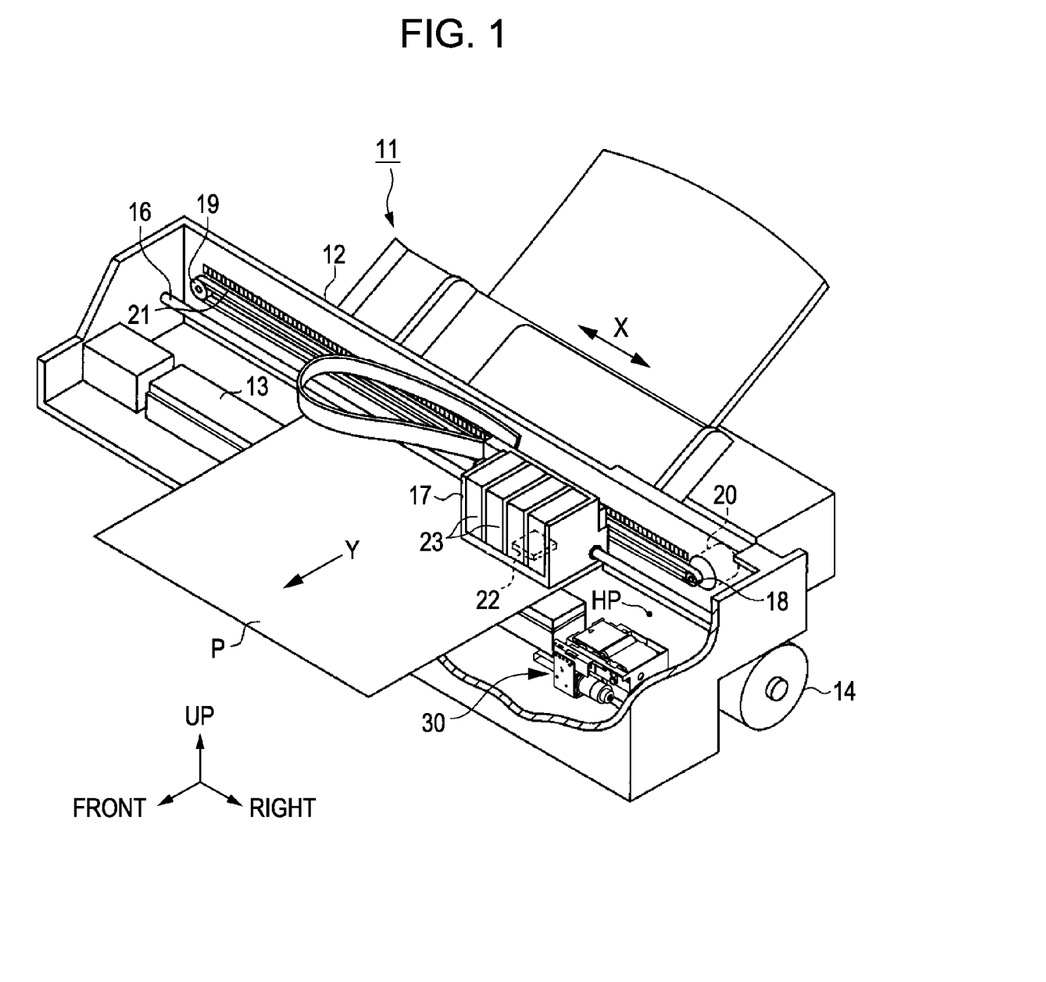
FIG. 1 is a perspective view which shows a perspective configuration of a printer according to an embodiment.

An embodiment of the invention will be described below with reference to FIGS. 1 to 5. In the embodiment, the invention is embodied as an ink jet printer which is a type of liquid ejection apparatus and a wiper unit in the printer. As shown in FIG. 1, a printer 11 includes a frame 12, a sheet feeding motor 14, a guide shaft 16, a carriage 17, a driving pulley 18, a driven pulley 19, a carriage motor 20, a timing belt 21, and a head maintenance device 30.

The frame 12 is formed in a substantially rectangular box-shape and has a support member 13 therein which is formed in a substantially rectangular plate shape. The longitudinal direction of the support member 13 is consistent with a main scan direction X (left-right direction in FIG. 1). The sheet feeding motor 14 is disposed behind and below the frame 12. The sheet feeding motor 14 feeds a recording paper P onto the support member 13 from the back side in a sub scan direction Y which is perpendicular to the main scan direction X. The guide shaft 16 has a rod shape and extends in a direction parallel to the longitudinal direction of the support member 13. The guide shaft 16 is disposed in the frame 12 and above the support member 13. The carriage 17 is formed in substantially rectangular box-shape and is supported on the guide shaft 16 so as to reciprocate in the axis direction of the guide shaft 16.

The driving pulley 18 and the driven pulley 19 are rotatably supported on the inner surface of the back wall of the frame 12 at positions that correspond to each end of the guide shaft 16. The driving pulley 18 is connected to an output shaft of the carriage motor 20. The timing belt 21 runs between a pair of pulleys 18, 19. The timing belt 21 is partially connected to the carriage 17. Accordingly, when the carriage motor 20 drives the carriage 17, the carriage 17 moves in the main scan direction X via the timing belt 21 while being guided by the guide shaft 16.

A recording head 22 which is an ejection head is disposed on the underside of the carriage 17. Four ink cartridges 23 are detachably mounted on the carriage 17 and each ink cartridge 23 stores ink as liquid to be supplied to the recording head 22. The flash point of ink is 95 degrees Celsius or more, and more preferably, 110 degrees Celsius or more.

A plurality of nozzles (not shown in the figure) that eject ink droplets of the respective colors are arranged in the front-back direction of the carriage 17 on the underside of the recording head 22, that is, on the surface that opposes the support member 13 so as to form a nozzle forming surface. Ink is ejected in the form of ink droplets from the nozzle forming surface. The ink droplets are ejected onto the recording paper P that has been fed on the support member 13. The printer 11 performs recording on the recording paper P by ejecting the ink droplets.

The head maintenance device 30 is disposed at a home position HP on the right side to the recording area in the frame 12 where the recording paper P is transported. When the recording head 22 is located at the home position HP, the head maintenance device 30 performs maintenance of the recording head 22.

Figure 2:
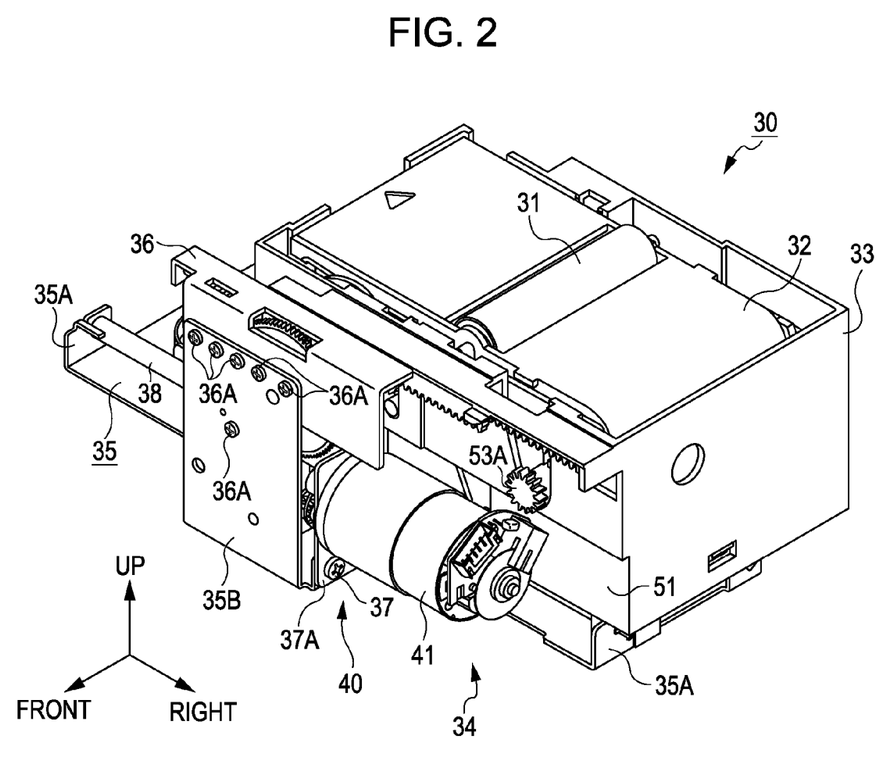
FIG. 2 is a perspective view which shows a perspective configuration of a head maintenance device of the printer according to the embodiment.

As shown in FIG. 2, the head maintenance device 30 includes a wiper 31, a wiper cassette 32, a wiper holder 33 and a wiper unit 34. The head maintenance device 30 also includes a cap (not shown in the figure) and a suction pump (not shown in the figure). The cap is configured to abut against the nozzle forming surface of the recording head 22 so as to surround the nozzles. The suction pump is actuated to suction and discharge the thickened ink in the recording head 22 as waste ink via the cap.

The wiper 31 is mounted on the wiper cassette 32. The wiper 31 is formed as a strap member made of a fabric that absorbs ink. The wiper 31 wipes off ink on the nozzle forming surface of the recording head 22 (see FIG. 1).

The wiper holder 33 is formed in a box-shape and holds the wiper cassette 32 so as to be detachable in the up-down direction. The wiper unit 34 includes a guide frame 35, a support frame 36, an attachment frame 37, a guide shaft 38 and a driving mechanism 40. The wiper unit 34 also includes set screws 36A, 37A for securing the frames 35, 36, 37.

The driving mechanism 40 includes a driving motor 41 as a driving source. The driving mechanism 40 moves the wiper holder 33 in a direction perpendicular to a nozzle row direction of the recording head 22, that is, the left-right direction, by driving the driving motor 41. When the driving motor 41 continuously drives for a certain period of times at a rated current, it reaches a specific heat generating temperature. The flash point of ink in the ink cartridge 23 is preferably higher than the temperature at which ink flames due to the driving motor 41 continuously driving for a certain period of times at a rated current. Or alternatively, the flash point of ink is preferably higher than the temperature at which ink flames due to sparks generated by the driving motor 41.

The guide frame 35 is disposed below the wiper holder 33. The guide frame 35 is attached on the inner surface of the bottom wall of the frame 12 of the printer 11 via brackets which are not shown in the figure.

The guide frame 35 has opposing pieces 35A formed at positions apart from each other in the left-right direction. The opposing pieces 35A are formed by bending at two positions apart from each other in the front-back direction. The guide shaft 38 extends in the left-right direction. The guide shaft 38 extends between two pairs of the opposing pieces 35A on the front and back side. Further, bearings (not shown in the figure) extending vertically downward are disposed on the underside of the wiper holder 33 such that each guide shaft 38 is rotatably supported therethrough. Since the bearings come into sliding contact with a pair of front and back guide shafts 38 in the axis direction of the guide shaft 38, the wiper holder 33 is supported by the guide shaft 38 so as to be movable in the left-right direction.

The guide frame 35 has a support piece 35B on the front end thereof at a substantially center position in the left-right direction. The support piece 35B bends in a substantially L-shape with the upper end extending upward. The upper end of the support piece 35B is connected with the support frame 36 via the set screw 36A. The support frame 36 bends in a substantially L-shape with the upper end extending backward toward the inside of the wiper holder 33. The right end of the proximal portion of the support piece 35B which extends in the horizontal direction is connected to the attachment frame 37 via the set screw 37A. The attachment frame 37 supports the driving motor 41 which serves as a driving source of the driving mechanism 40.

The driving motor 41 is attached on the outside of the wiper holder 33 via the attachment frame 37. That is, a housing 51 of the wiper holder 33 as a wall is disposed between the driving motor 41 and the winding mechanism 50 (feeding roller 52). The wiper holder 33 moves in the left-right direction with respect to the wiper unit 34 within the range of the guide shaft 38 by driving the driving motor 41. The driving motor 41 is provided at a fixed position with respect to the wiper unit 34.

Figure 3:
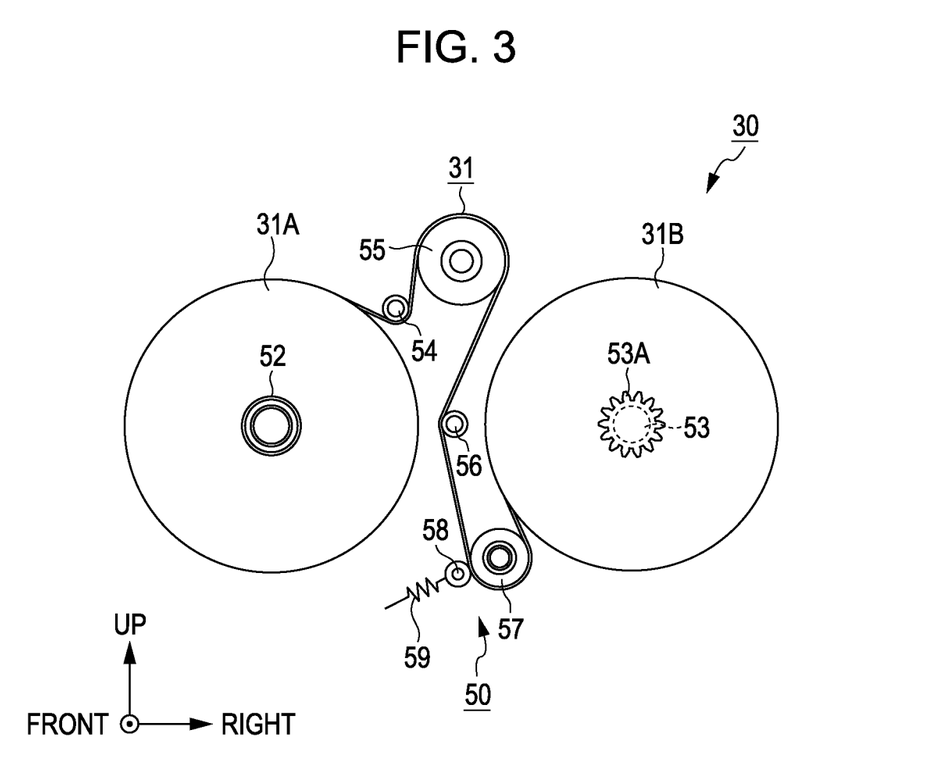
FIG. 3 is a front elevation view which shows a front configuration of a winding mechanism of the head maintenance device of the printer according to the embodiment.

As shown in FIG. 3, the winding mechanism 50 includes a feeding roller 52 and a winding roller 53. The winding mechanism 50 also includes a tension roller 54, a pressing roller 55, a tension roller 56, a relay roller 57, a nip roller 58, a spring member 59 and the housing 51 (see FIG. 2). The winding roller 53 has a winding gear 53A at the end thereof.

The feeding roller 52 and the winding roller 53 have the front and back ends that are rotatably supported on the housing 51. The winding gear 53A of the winding roller 53 is disposed outside of the housing 51. The nip roller 58 is connected to the spring member 59. The spring member 59 presses the nip roller 58 against the relay roller 57.

One end of the wiper 31 is wound around the feeding roller 52. The other end of the wiper 31 is wound around the winding roller 53. The wiper 31 is wound around the tension roller 54, the pressing roller 55 and the relay roller 57 between the feeding roller 52 and the winding roller 53. The wiper 31 is nipped between the nip roller 58 and the relay roller 57. Accordingly, the wiper 31 is pressed against the relay roller 57 due to a bias of the spring member 59. The wiper 31 has a certain tension since it is wound around the tension roller 54, the tension roller 56, the relay roller 57 and the nip roller 58.

Figure 4A:
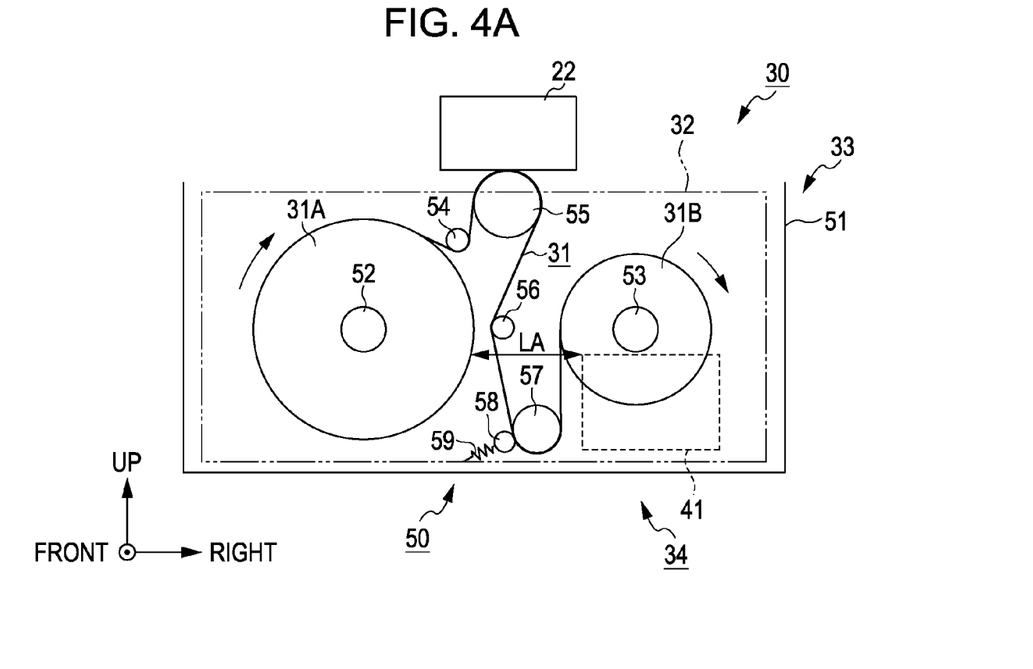
FIG. 4A is a front elevation view which schematically shows the head maintenance device according to the embodiment with a wiper holder being located at a position closest to a feeding roller with respect to a wiper unit.
Figure 4B:
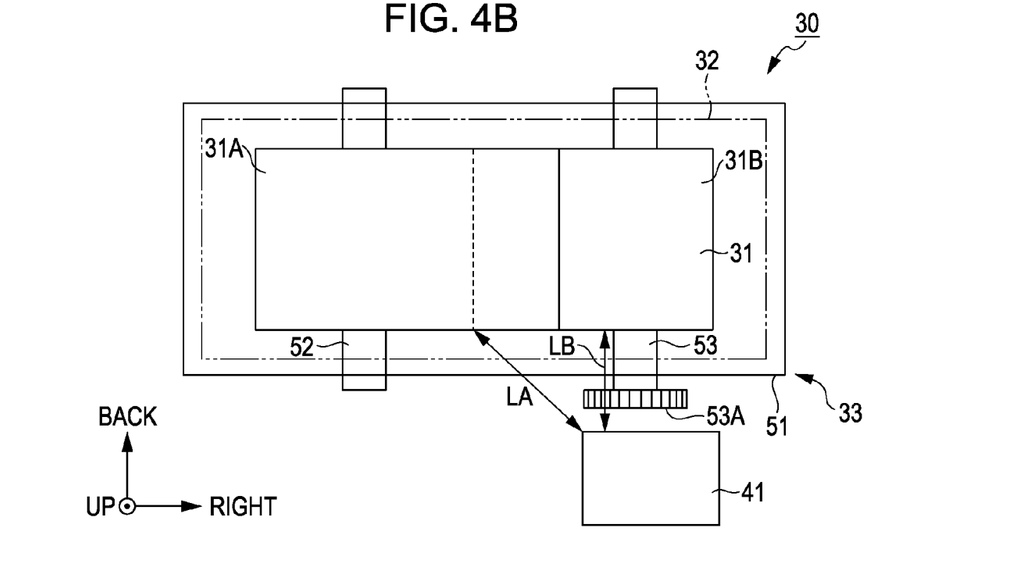
FIG. 4B is a plan view of FIG. 4A.

With reference to FIGS. 4A and 4B, the relationship between the winding mechanism 50 and the driving motor 41 will be described below. In FIG. 4B, the tension roller 54, the pressing roller 55, the tension roller 56, the relay roller 57, the nip roller 58 and the spring member 59 are omitted.

The winding roller 53 rotates by driving the driving motor 41. In this state, the feeding roller 52 is driven to rotate due to a tension of the wiper 31. As a result, the wiper 31 wound around the feeding roller 52 is fed out from the feeding roller 52. The wiper 31 fed out from the feeding roller 52 is wound by the winding roller 53.

The pressing roller 55 presses the wiper 31 against the nozzle forming surface. Accordingly, ink is attached on the wiper 31 which has been passed by the pressing roller 55. That is, the wiper 31 has a feeding-out portion 31A on the side of the feeding roller 52 and a winding portion 31B on the side of the winding roller 53 with a portion that faces the pressing roller 55 therebetween such that ink is not attached on the feeding-out portion 31A and ink is attached on the winding portion 31B.

The driving motor 41 is disposed at a position closer to the winding roller 53 than to the feeding roller 52. The driving motor 41 is always disposed at a position closer to the winding roller 53 than to the feeding roller 52 within the moving range of the wiper holder 33 with respect to the wiper unit 34.

The distance from the driving motor 41 to a portion of the winding portion 31B which is closest to the driving motor 41 (hereinafter, referred to as a "winding distance LB") is smaller than the distance from the driving motor 41 to a portion of the feeding-out portion 31A which is closest to the driving motor 41 (hereinafter, referred to as a "feeding distance LA"). The feeding distance LA is preferably 30 mm or more. Further, the winding distance LB is preferably 20 mm or less.

Figure 5:
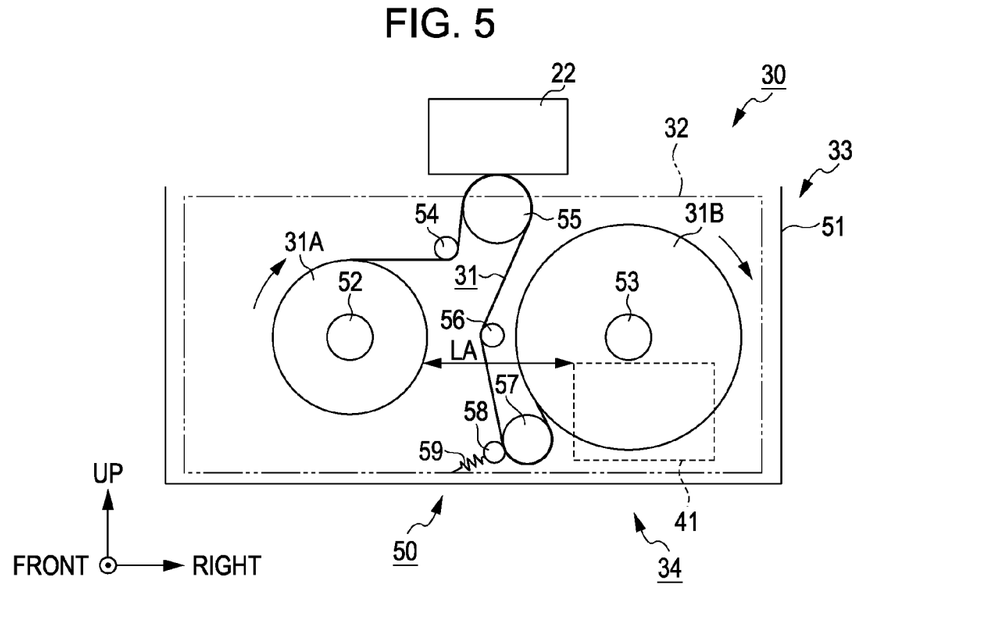
FIG. 5 is a front elevation view which schematically shows the head maintenance device according to the embodiment with a wiper holder being located at a position closest to a feeding roller with respect to a wiper unit.

As the wiper 31 is wound by the winding roller 53, the feeding distance LA varies. As shown in FIG. 5, when the wiper 31 has been wound by the winding roller 53 from the state shown in FIG. 4A, that is, the amount of the wiper 31 which is wound around the feeding roller 52 decreases, the feeding distance LA increases. On the other hand, as the wiper 31 is wound by the feeding roller 52, the feeding distance LA decreases.

Further, as the wiper holder 33 moves with respect to the wiper unit 34, the feeding distance LA varies. When the wiper holder 33 moves toward the right side to the wiper unit 34, that is, toward the side of the feeding roller 52, the feeding distance LA decreases.

When the wiper 31 is wound around the feeding roller 52 to the maximum and the wiper holder 33 is located on the right side to the wiper unit 34, the feeding distance LA becomes minimum. Even when the feeding distance LA becomes minimum, it is preferable that the feeding distance LA is 30 mm or more.

The driving motor 41 is disposed so as to oppose the front side of the winding roller 53. Accordingly, the winding distance LB remains the same regardless of the amount of the wiper 31 wound by the winding roller 53 and the position of the wiper holder 33 with respect to the wiper unit 34.

Cleaning operation by the head maintenance device 30 will be described below. When cleaning operation is not performed, the wiper holder 33 has been moved with respect to the driving motor 41 to a position closest to the feeding roller 52. In this state, a portion of the wiper 31 which is wound around the pressing roller 55 does not abut against the recording head 22.

When cleaning operation starts, the wiper holder 33 moves with respect to the driving motor 41 toward the winding roller 53 by driving the driving motor 41. In this state, a portion of the wiper 31 which is wound around the pressing roller 55 moves while being in contact with the nozzle forming surface of the recording head 22. This allows ink attached on the nozzle forming surface to be absorbed in the wiper 31. When the wiper holder 33 has been moved to a position closest to the winding roller 53, a portion of the wiper 31 which is wound around the pressing roller 55 does not abut against the nozzle forming surface. Then, a drive force of the driving motor 41 is transmitted to the winding gear 53A via a gear which is not shown in the figure. As a result, the winding gear 53A rotates, thereby rotating the winding roller 53. Accordingly, a portion of the wiper 31 that does not absorb ink is provided as a portion wound around the pressing roller 55.

When cleaning operation ends, the wiper holder 33 moves with respect to the driving motor 41 toward the feeding roller 52 by driving the driving motor 41, and then stops at a position closest to the feeding roller 52.

Operation of the printer 11 will be described below. The feeding distance LA is defined as 30 mm or more, which is larger than the maximum distance that sparks generated by the driving motor 41 fly, due to the position of the feeding-out portion 31A. Since sparks do not reach the feeding-out portion 31A, the effect to the feeding-out portion 31A can be eliminated even when ink is not attached.

On the other hand, ink is attached on the winding portion 31B. As a result, even the winding distance LB is defined as 20 mm or less, which is smaller than 30 mm, the effect of sparks to the winding portion 31B can be eliminated.

According to the above-mentioned embodiment, the following effect can be achieved:

(1) The flash point of ink in the printer 11 is 95 degrees Celsius or more. Further, the driving motor 41 is disposed at a position closer to the winding roller 53 than to the feeding roller 52.

The ambient temperature of the driving motor 41 increases by driving the driving motor 41. Accordingly, it is preferable that the wiper (strap member) 31 wound by the winding roller 53, which is closer to the driving motor 41 than the feeding roller 52 is, is resistant to flame. On the wiper (strap member) 31 wound by the winding roller 53, ink having a high flash point is attached. Accordingly, the wiper (strap member) 31 wound by the winding roller 53 is hard to flame. That is, since a flame resistance required for the wiper (strap member) 31 is low, choices for a material of the wiper (strap member) 31 are widened. Moreover, since the driving motor 41 can be disposed at a position closer to the winding roller 53 compared with the case where ink has a low flash point, more flexible positioning of the driving motor 41 can be possible. Further, when the driving motor 41 is disposed at a position close to the winding roller 53, ink absorbed by wiper (strap member) 31 on the side of the winding roller 53 can be dried off.

(2) The feeding distance LA of the printer 11 is 30 mm or more. That is, the feeding distance LA is sufficiently larger than the maximum distance that sparks generated by the driving motor 41 fly. Accordingly, it is possible to prevent sparks generated by the driving motor 41 from reaching to the feeding-out portion 31A.

(3) The printer 11 has the housing 51 disposed between the feeding-out portion 31A and the driving motor 41. Accordingly, it is possible to prevent sparks generated by the driving motor 41 from reaching to the feeding-out portion 31A, since the housing 51 is disposed therebetween.

(4) The winding distance LB of the printer 11 is 20 mm or less. Accordingly, the winding roller 53 and the driving motor 41 can be positioned in more compact size compared with the case where the winding distance LB is more than 20 mm.

Figure 6:
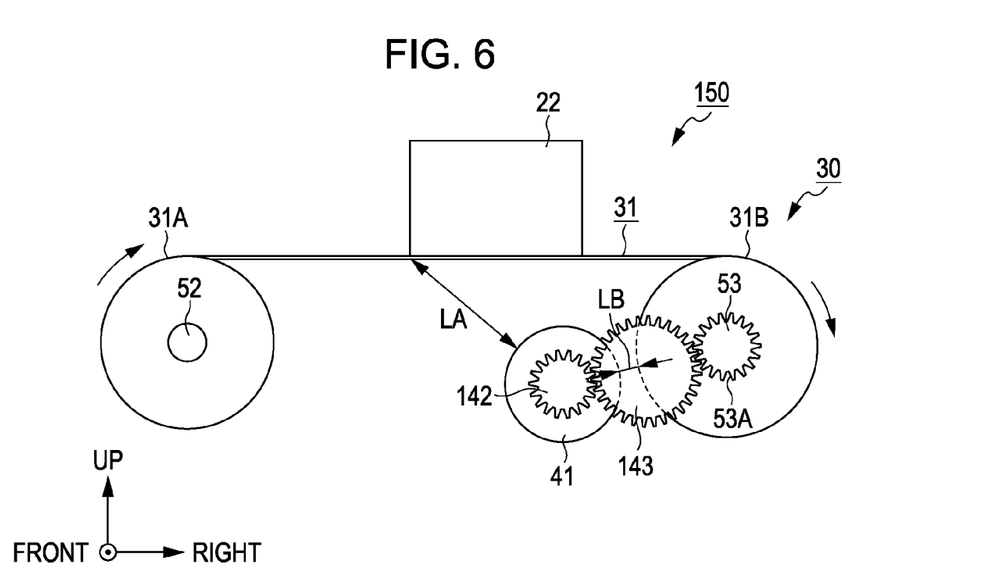
FIG. 6 is a front elevation view which shows a front configuration of a wiper cassette of the head maintenance device according to a modified example without showing a housing.

The above-mentioned embodiment can be modified as follows:

The winding mechanism 50 according to the above-mentioned embodiment includes the tension roller 54, the pressing roller 55, the tension roller 56, the relay roller 57, the nip roller 58 and the spring member 59. On the other hand, in a winding mechanism 150 of a modified example which is shown in FIG. 6, the tension roller 54, the pressing roller 55, the tension roller 56, the relay roller 57, the nip roller 58 and the spring member 59 are omitted. Further, the driving motor 41 is disposed at a position between the feeding roller 52 and the winding roller 53.

When the nozzle forming surface is wiped off by using the wiper 31, the feeding roller 52 and the winding roller 53 are moved toward the recording head 22 so that the wiper 31 abuts against the nozzle forming surface of the recording head 22. Further, the driving motor 41 may be used to move the feeding roller 52 and the winding roller 53 toward the recording head 22.

An output gear 142 of the driving motor 41 is connected to the winding gear 53A via a transmission gear 143. The driving motor 41 rotates to cause the winding gear 53A to rotate, thereby rotating the winding roller 53 and winding the wiper 31.

By winding the wiper 31 while being in contact with the nozzle forming surface, ink attached on the nozzle forming surface can be wiped off. Further, the wiper 31 may be moved to abut against the nozzle forming surface so as to absorb ink attached on the nozzle forming surface, and then, may be moved away from the nozzle forming surface for wounding.

The printer 11 according to the above-mentioned embodiment includes the housing 51 disposed between the driving motor 41 and the winding mechanism 50. On the other hand, in the printer 11 of a modified example, a portion of the housing 51 between the driving motor 41 and the winding portion 31B is omitted. The modified example is hereinafter referred to as a modified example X.

In the modified example X, a portion of the housing 51 between the driving motor 41 and the feeding-out portion 31A can be further omitted.

In the modified example X, the driving motor 41 and the winding portion 31B can be in contact with each other. That is, the winding distance LB may be 0 mm.

The winding mechanism 50 according to the above-mentioned embodiment includes the tension roller 54, the pressing roller 55, the tension roller 56, the relay roller 57, the nip roller 58 and the spring member 59. On the other hand, in the winding mechanism 150 of a modified example, at least one of the tension roller 54, the pressing roller 55, the tension roller 56, the relay roller 57 and the nip roller 58 is omitted.

The printer 11 according to the above-mentioned embodiment includes has four ink cartridges 23. On the other hand, the printer 11 includes three or less ink cartridges 23 or five or more ink cartridges 23. Or alternatively, the ink cartridge 23 may be one.

In the printer 11 according to the above-mentioned embodiment, ink in all the ink cartridges 23 is preferably 95 degrees Celsius or more. However, it may be allowable that ink in one of the ink cartridges 23 is less than 95 degrees Celsius as long as the ink that is absorbed and mixed on the wiper 31 is 95 degrees Celsius or more.

Although the strap member 31 is embodied as a wiper in the above-mentioned embodiment, the strap member 31 may be used in a state being away from the nozzle forming surface as a flashing receiver that stores liquid ejected from the recording head 22 for head maintenance.

The strap member 31 may be made of any material that is capable of absorbing or holding ink, for example, a porous foam material and rubber material.

Although the liquid ejection apparatus is embodied as an ink jet printer 11 in the above-mentioned embodiment, liquid ejection apparatuses that eject or dispense liquid other than ink may be used. The invention may be applied to various liquid ejection apparatuses having a liquid ejection head or the like that ejects fine liquid droplets. It is noted that the liquid droplets means a state of liquid that is ejected from the liquid ejection apparatuses and are intended to include those in a particle, tear drop or string shape. Further, the liquid as described herein may be any material that can be ejected from liquid ejection apparatuses. For example, it may include a material in liquid phase such as liquid having high or low viscosity, sol, gel water, other inorganic solvent, organic solvent and liquid solution, and a material in melted state such as liquid resin and liquid metal (molten metal). Further, in addition to a material in a liquid state, it may include particles of functional material made of solid substance such as pigment and metal particles, which is dissolved, dispersed or mixed in a solvent. Further, typical examples of liquid include ink as mentioned above, liquid crystal and the like. The ink as described herein includes various liquid components such as general water-based ink, oil-based ink, gel ink and hot melt ink. Specific examples of liquid ejection apparatus may include, for example, liquid ejection apparatuses that eject liquid containing materials such as electrode material and color material in a dispersed or dissolved state, which are used for manufacturing of liquid crystal displays, electro-luminescence (EL) displays, surface emitting displays or color filters, liquid ejection apparatuses that eject bioorganic materials used for manufacturing bio-chips, liquid ejection apparatuses that are used as a precision pipette and eject liquid of a sample, textile printing apparatuses and micro dispensers. Further, examples of fluid ejection apparatus may also include liquid ejection apparatuses that eject lubricant to precision instrument such as a clock or camera in a pin-point manner, liquid ejection apparatuses that eject transparent resin liquid such as ultraviolet cured resin onto a substrate for manufacturing minute hemispheric lenses (optical lenses) used for optical communication elements or the like, and liquid ejection apparatuses that eject acid or alkali etching liquid for etching a substrate or the like. The invention may be applied to any one of the above-mentioned liquid ejection apparatuses.

What is claimed is:

1. A liquid ejection apparatus comprising:
an ejection head having nozzles that eject liquid;
a strap member that holds the liquid ejected from the ejection head;
a feeding roller and a winding roller around which the strap member is wound;
a holder that holds the strap member, the feeding roller, and the winding roller and
a driving source that rotates the winding roller,
wherein a flash point of the liquid that is held in the strap member is 95 degrees Celsius or more,
wherein the driving source is disposed at a position closer to the winding roller than to the feeding roller, and
wherein a distance between the driving source and the feeding roller varies according to a movement of the holder with respect to the driving source, wherein when the feeding roller is moved to the farthest position from the driving source, the driving source rotates the winding roller to wind the strap member.

2. The liquid ejection apparatus according to claim 1, wherein a portion of the strap member which lies on the side of the feeding roller with respect to a portion that corresponds to the nozzle forming surface is defined as a feeding-out portion, and a distance between the feeding-out portion and the driving source is 30 mm or more.

3. The liquid ejection apparatus according to claim 1, wherein a portion of the strap member which lies on the side of the feeding roller with respect to a portion that corresponds to the nozzle forming surface is defined as a feeding-out portion, and the liquid ejection apparatus includes a wall which is disposed between the feeding-out portion and the driving source.

4. The liquid ejection apparatus according to claim 1, wherein a portion of the strap member which lies on the side of the winding roller with respect to a portion that corresponds to the nozzle forming surface is defined as a winding portion, and a distance between the winding portion and the driving source is 20 mm or less.

5. The liquid ejection apparatus according to claim 1, wherein the strap member is wound up by the winding roller while being in contact with the nozzle forming surface.

* * * * *